US012578509B2

(12) United States Patent
Ding et al.

(10) Patent No.: US 12,578,509 B2
(45) Date of Patent: Mar. 17, 2026

(54) OPTICAL ARTICLE HAVING A MULTILAYERED ANTIREFLECTIVE COATING ON ITS REAR MAIN FACE

(71) Applicant: ESSILOR INTERNATIONAL, Charenton-le-Pont (FR)

(72) Inventors: Xingzhao Ding, Singapore (SG); Ker Chin Ang, Singapore (SG); Andrew Pelayo, Singapore (SG)

(73) Assignee: Essilor International, Charenton-le-Pont (FR)

( * ) Notice: Subject to any disclaimer, the term of this patent is extended or adjusted under 35 U.S.C. 154(b) by 324 days.

(21) Appl. No.: 18/267,669

(22) PCT Filed: Dec. 20, 2021

(86) PCT No.: PCT/EP2021/086889
§ 371 (c)(1),
(2) Date: Jun. 15, 2023

(87) PCT Pub. No.: WO2022/136320
PCT Pub. Date: Jun. 30, 2022

(65) Prior Publication Data
US 2024/0061155 A1     Feb. 22, 2024

(30) Foreign Application Priority Data
Dec. 21, 2020     (EP) ..................................... 20306630

(51) Int. Cl.
*G02B 1/115* (2015.01)
(52) U.S. Cl.
CPC .................................... *G02B 1/115* (2013.01)
(58) Field of Classification Search
CPC ...... G02B 5/282; G02B 5/208; G02B 5/0883; G02B 1/10; G02B 1/11; G02B 1/115; G02B 1/116; G02B 1/14; G02B 1/105
(Continued)

(56) References Cited

U.S. PATENT DOCUMENTS

| | | | |
|---|---|---|---|
| 4,211,823 A | 7/1980 | Suzuki et al. |
| 5,015,523 A | 5/1991 | Kawashima et al. |
| | (Continued) | | |

FOREIGN PATENT DOCUMENTS

| | | |
|---|---|---|
| EP | 0614957 | 9/1994 |
| EP | 3301488 | 4/2018 |
| | (Continued) | |

OTHER PUBLICATIONS

English translation of JP 2015022187. (Year: 2015).*
International Search Report issued in corresponding PCT Application No. PCT/EP2021/086889, mailed Mar. 14, 2022.

*Primary Examiner* — Jie Lei

(74) *Attorney, Agent, or Firm* — Norton Rose Fulbright US LLP

(57) ABSTRACT

This invention relates to an ophthalmic lens comprising a substrate with a front main face and with a rear main face, said rear main face being coated with a multilayered antireflective coating comprising a stack of at least two layers having a refractive index higher than or equal 1.55, defined as "HI layer" and at least two layers having a refractive index lower than 1.55, defined as LI layer, characterized in that said multilayered antireflective coating is such that: —the mean reflection factor in the near infrared (NIR) region $R_m^{NIR}$ is lower than or equal to 8% at an angle of incidence of 35°, and 10—the mean reflection factor RUV (280-380 nm), weighted by the function $W(\lambda)$ defined in the ISO 13666:1998 standard, is equal to or lower than 5% at an angle of incidence of 35°.

20 Claims, 3 Drawing Sheets

10

70

60

30

50

40

20

Figure 1:
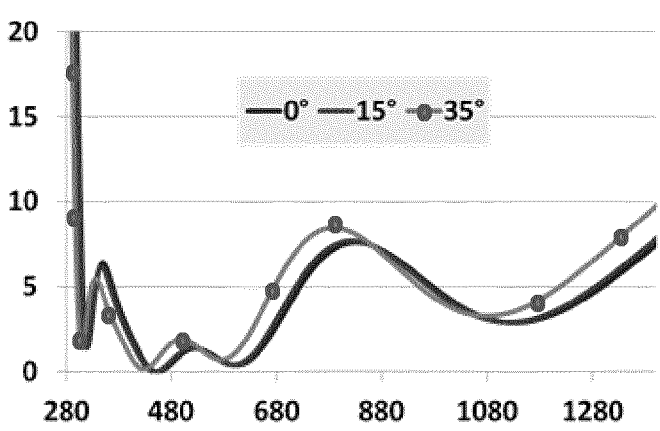

(58) Field of Classification Search
USPC ....... 359/601, 580, 581, 584–589, 359, 360,
359/884
See application file for complete search history.

(56) References Cited

U.S. PATENT DOCUMENTS

| | | | |
|---|---|---|---|
| 2016/0003982 A1 | 1/2016 | Avetisian et al. | |
| 2018/0113326 A1 | 4/2018 | Gloege et al. | |
| 2019/0171039 A1 | 6/2019 | Ding et al. | |

FOREIGN PATENT DOCUMENTS

| | | | | |
|---|---|---|---|---|
| EP | 3627194 | | 3/2020 | |
| FR | 2702486 | | 9/1994 | |
| JP | 2015022187 | * | 2/2015 | .............. G02B 1/11 |
| WO | WO 2011/080472 | | 7/2011 | |
| WO | WO 2012/076714 | | 6/2012 | |

* cited by examiner

FIG. 7

10

70

60

30

50

40

20

OPTICAL ARTICLE HAVING A MULTILAYERED ANTIREFLECTIVE COATING ON ITS REAR MAIN FACE

CROSS-REFERENCE TO RELATED APPLICATIONS

This application is a national phase application under 35 U.S.C. § 371 of International Application No. PCT/EP2021/086889 filed 20 Dec. 2021, which claims priority to European Patent Application No. 20306630.3 filed 21 Dec. 2020. The entire contents of each of the above-referenced disclosures is specifically incorporated by reference herein without disclaimer.

1. FIELD OF THE INVENTION

The present invention relates to an optical article comprising an antireflective coating having both low reflection in the near infrared (NIR) region (780-1400 nm) and in the UVA- and UVB-radiation range (280-400 nm), while preferably also strongly reducing reflection in the visible region (380 to 780 nm). The optical article may especially be an optical lens, preferably an ophthalmic lens, such as a spectacle lens.

2. DESCRIPTION OF RELATED ART

Currently, traditional antireflective coatings are often designed and optimized to reduce reflection on the lens surface in the visible region, typically within the spectrum range of from 380 to 780 nm.

To be qualified as antireflective according to ISO 8980-4 standard, coatings must have a mean light reflection factor below 2.5%. In general, the mean light reflection factor in the visible region $R_v$ on the front and/or rear faces of an ophthalmic lens is between 1.5 to 2.5%.

An antireflection coating is usually a multilayer stack comprising interferential thin layers, generally an alternation of layers based on a dielectric material of high refractive index and a dielectric material of low refractive index. When deposited on a transparent substrate, the function of such a coating is to reduce its light reflection and therefore to increase its light transmission. A substrate thus coated will therefore have its transmitted light/reflected light ratio increased, thereby improving the visibility of objects placed behind it. When it is sought to achieve a maximum antireflection effect, it is then preferable to provide both faces (front and rear faces) of the substrate with this type of coating.

However, throughout life, the eye is exposed to daily fluxes of solar radiation. Solar radiation is filtered by the Earth's atmosphere so that at sea level about 80% of the solar energy is restricted to a narrow spectral band from about 300 nm in the ultraviolet to 1100 nm in the infrared. Longer wavelengths are primarily filtered out by atmospheric water vapor, whereas shorter wavelengths are absorbed by the ozone layer. Furthermore, certain spectral components of solar light incident on the cornea are partially filtered out before reaching the human retina. Both the cornea and the lens absorb part of the infrared radiation-mainly the water bands at 980 nm, 1200 nm, and 1430 nm. The vitreous absorbs light above 1400 nm, up to 10 μm.

Thus, the non-ionizing radiation reaching the retina is the so-called 'visible component' of the electromagnetic spectrum (380-780 nm), the UV range (280-380 nm) and some of the near infrared (780-1400 nm, NIR).

However, UV radiation, part of visible light and infrared light reaching the human retina can induce tissue damage via at least one of three fundamental processes: photomechanical (or photoacoustic), photothermal (photocoagulation) and photochemical, depending on its fluence rate, total dose and spectral characteristics.

Especially, intensive NIR would be harmful to retina. It has been also reported that NIR could be one of the potential causes for dry eyes and cataracts.

In addition, it is also known that UVA and UVB bands are also particularly harmful to the retina. Indeed, UV radiation may also lead to macular degeneration, cataract, pterygium, eyelid skin cancer, and other damages, which could eventually cause vision loss.

Ultraviolet (UV) light is the portion of the luminous spectrum from 380 nm to 100 nm. The UVB corresponds to the range from 280 nm to 320 nm and the UVA to the range from 320 to 380 nm.

Thus, it is desirable to limit both the exposure to potentially UVA- and UVB-radiation range (280-400 nm) and to harmful NIR.

Moreover, the part of the visible spectrum, ranging from around 380 nm to around 500 nm, corresponds to a high-energy, essentially blue light.

Many studies (see for example Kitchel E., "*The effects of blue light on ocular health*", Journal of Visual Impairment and Blindness Vol. 94, No. 6, 2000 or Glazer-Hockstein and al., Retina, Vol. 26, No. 1. pp. 1-4, 2006) suggest that blue light has harmful effects on the eye, and especially on the retina.

Indeed, ocular photobiology studies (Algvere P. V. and al., "*Age-Related Maculopathy and the Impact of the Blue Light Hazard*", Acta Ophthalmo. Scand., Vol. 84, pp. 4-15, 2006) and clinical trials (Tomany S. C. and al., "*Sunlight and the 10-Year Incidence of Age-Related Maculopathy. The Beaver Dam Eye Study*", Arch Ophthalmol., Vol. 122. pp. 750-757, 2004) demonstrated that an excessively prolonged or intense exposure to blue light may induce severe ophthalmic diseases such as age-related macular degeneration (ARMD).

Thus, prolonged exposure to harmful blue light may cause retinal damage. For instance, extensive exposure (higher than 3-4 hours per day) to blue-light emitted by digital devices (computers, smartphones, tablets, etc.) is one of the main reason for experiencing eye fatigue, blurred vision, dry eyes, and headaches.

However, part of this blue light, with a wavelength ranging from 465 nm to 495 nm approximately, promotes health since it is implicated in mechanisms for regulating biorhythms, referred to as "circadian cycles".

Hence, it is nowadays well known how to achieve an efficient coating with very low reflection in visible region.

However it is difficult to achieve an efficient coating having both a low reflection in the NIR region and in the UVA- and UVB-radiation range, while having also preferably a very low reflection in visible region, especially in the ophthalmic field requiring very thin antireflective film.

Indeed, conventionally, interferential multilayer NIR filters have more than 40 layers. These kinds of stacks are too thick, have high internal stress and have too many layers, which are not practically acceptable for ophthalmic lens applications due to mechanical issues and economic reasons. Moreover, most of these IR filters do not cope with UV and/or blue cut.

In addition, optimizing the reflection performances over the NIR region reveals generally detrimental to the antireflective performances in the visible region. Conversely, optimizing only the antireflective performances in the visible region does not make sure that satisfactory reflection properties can be obtained in the NIR region.

The addition of another constraint, namely optimizing the reflection in UV and/or in the harmful blue light region, increases the difficulty for reaching the intended goal.

Furthermore, for an optical lens, such as ophthalmic lens, protection against all these hazardous lights, such as UV radiations, "harmful blue light", and NIR, may not be a major problem for the lights coming from the front direction. Indeed, the major part of this hazardous radiation which comes from the front of the wearer and might attain the wearer's eye (normal incidence, 0° to 15°) generally gets absorbed by the ophthalmic lens substrate and/or by a layer of a hard coat deposited onto said substrate.

However, the hazardous radiation resulting from light sources located behind the wearer could be reflected on the lens rear face and reach the wearer's eye if the lens is not provided with an antireflective coating which is efficient in the above-mentioned NIR region, UV band and preferably phototoxic blue light band, thus potentially affecting the wearer's health. It is admitted that the light rays that may be reflected by the lens rear face and consequently reach the wearer's eyes have a narrow incidence angle range, e.g. from 30° to 45° (oblique incidence).

For clear lenses, the essential requirement is also the high transmittance in the visible region.

We know from the prior art, the document US 2018/0113326. This documents relates to a spectacle lens having a high reflectivity in the NIR at an angle of incidence of 0° and having a low reflectivity in the NIR at an angle of incidence of 35°, for avoiding respectively front and oblique reflection of infrared radiation.

Especially, the spectacle lens of this document comprises:
a lens substrate, and
a multiple layer coating that is applied onto the lens substrate,
wherein the coating has a first reflectivity of at least 20%, preferably 30%, 40%, 50%, 60% or else 70% or more for near infrared light at a first wavelength λ(NIR), which impinges on the coating at an angle of incidence of 0°, and wherein the coating has a second reflectivity for near infrared light at the first wavelength λ(NIR), which impinges on the coating at an angle of incidence of 35°, the second reflectivity being reduced by at least 10% in relation to the first reflectivity.

Furthermore, this document describes to add additional coating, for instance in order to offer additional protection against for instance high-energy or short-wavelength blue light.

Hence, it would be advisable to improve the multiple layer coating described in this document. In fact, this multiple layer coating is only efficient for limiting near infrared light at an angle of incidence of 35° and not also the harmful blue light (another coating is necessary) and/or the UV radiation.

Document US 2016/0003982 describes an anti-reflective backside coating for lenses wherein the IR reflection factor (RIR) of the coating measured across 780-1400 nm does not exceed 14% measured at an angle of incidence of 30° or 45°. However, as it will be illustrated below in the experimental part, the exemplified anti-reflective coatings of this document do not enable to obtain both low reflection in the UVA-UVB-radiation range and in the NIR region, especially for an angle of incidence of 30° or 45°.

Indeed, there is still a need to provide a sole and thin antireflective coating for optical lenses and especially for the rear main face of optical lenses, having very good antireflective properties in the UVA- and UVB-radiation range, while having at the same time low reflection in the NIR region, versus the antireflective coatings of the prior art. By definition, the thickness of this antireflective coating should be the smallest as possible and preferably equal to or lower than 1 µm, and preferably equal to or lower than 500 nm.

There is also still a need to provide a sole and thin antireflective coating having also very good antireflective properties in the visible light (380-780 nm) and that is able to limit the exposure to potentially blue light, in particular as regards to the wavelength band which presents an increased risk (380-500 nm).

Hence, it is a real challenge to design a new optical lens having a sole antireflective coating which enables a very low reflection both in the NIR region and in the UVA- and UVB-radiation range (280-400 nm), and even more a real challenge to design a sole and thin antireflective coating that enables a very low reflection from the UV band to NIR region, e.g. from 280 nm to 1400 nm.

3. SUMMARY OF THE INVENTION

An object of the invention is therefore to remedy the above drawbacks, by seeking to develop an optical article, preferably an optical lens such as a spectacle lens, comprising a substrate in mineral or organic glass comprising at least an antireflective coating (AR coating). This only antireflective coating possessing concurrently very good antireflective performances in the visible region, while having low reflection both in the NIR region and in the UVA- and UVB-radiation range and to do so without compromising the economic and/or industrial feasibility of its manufacture.

The invention therefore relates to an optical article, preferably an optical lens comprising a substrate with a front main face and with a rear main face, at least said rear main face being coated with a multilayered antireflective coating comprising a stack of at least two layers having a refractive index higher than or equal 1.55, defined as "HI layer" and at least two layers having a refractive index lower than 1.55, defined as LI layer,
characterized in that said multilayered antireflective coating is such that:
the mean reflection factor in the near infrared (NIR) region $R_m^{NIR}$ is lower than or equal to 8% at an angle of incidence of 35°, and
the mean reflection factor $R_{UV}$ (280-380 nm), weighted by the function $W(\lambda)$ defined in the ISO 13666:1998 standard, is equal to or lower than 5% at an angle of incidence of 35°.

Therefore, the optical article according to the invention comprises a highly efficient antireflective (AR) coating that enables both a low reflection in the NIR region and the UVA- and UVB-radiation range. Indeed, contrary to the prior art, it is not necessary to have two AR coatings so as to obtain the claimed characteristics of the invention. The only AR coating of the invention enables to get them.

4. BRIEF DESCRIPTION OF THE DRAWINGS

Figure 2:
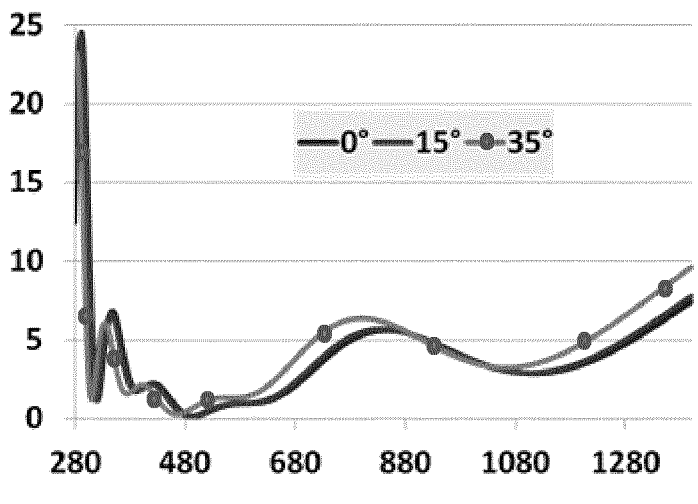
Figure 3:
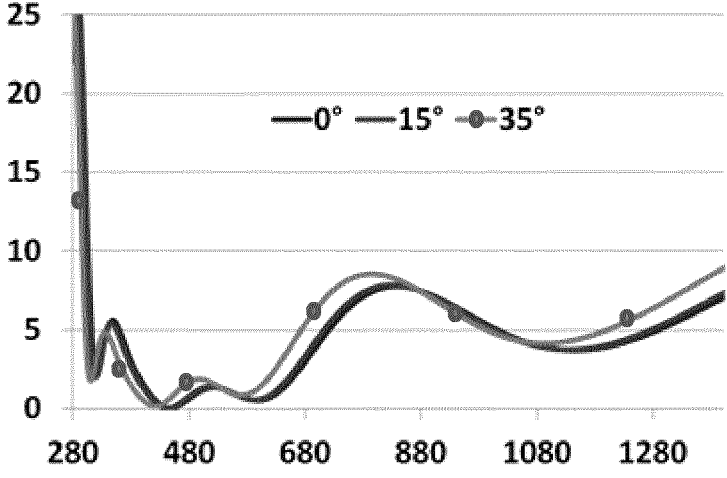
Figure 4:
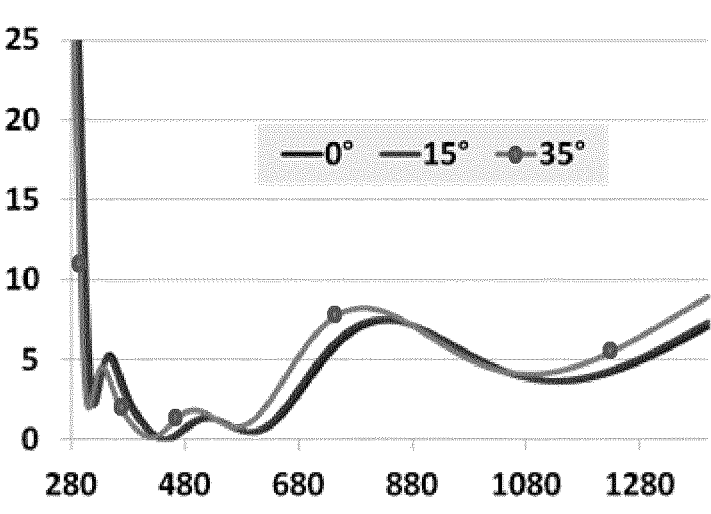
Figure 5:
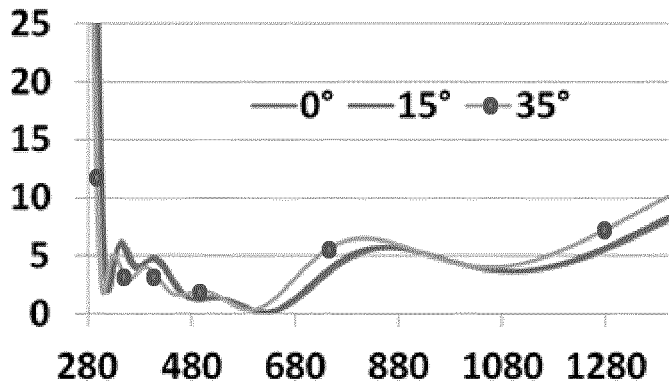
Figure 6:
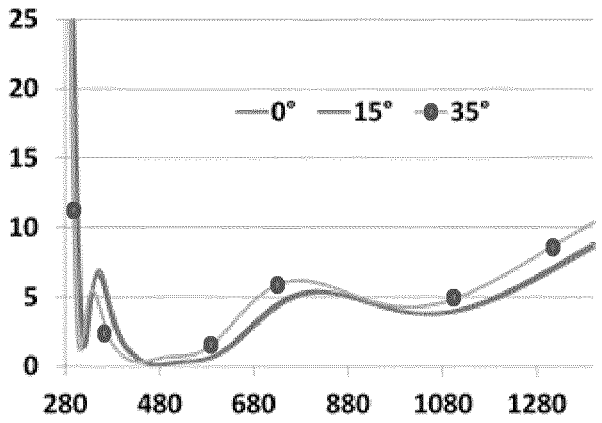

The present invention will be described in more detail by referring to the appended drawings, wherein FIGS. 1 to 6 show the variation of the reflection R (%) on the rear surface of lenses 1 to 6, prepared respectively in the examples 1 to 6 of the present application at an angle of incidence θ of 0°, 15° and 35° as a function of the wavelength λ (nm) in the UVB (280 to 315 nm), UVA (315 to 400 nm) bands, in the visible region (380 to 780 nm), in the harmful blue light region (420-450 nm) and in the NIR region (780-1400 nm).

Figure 7:
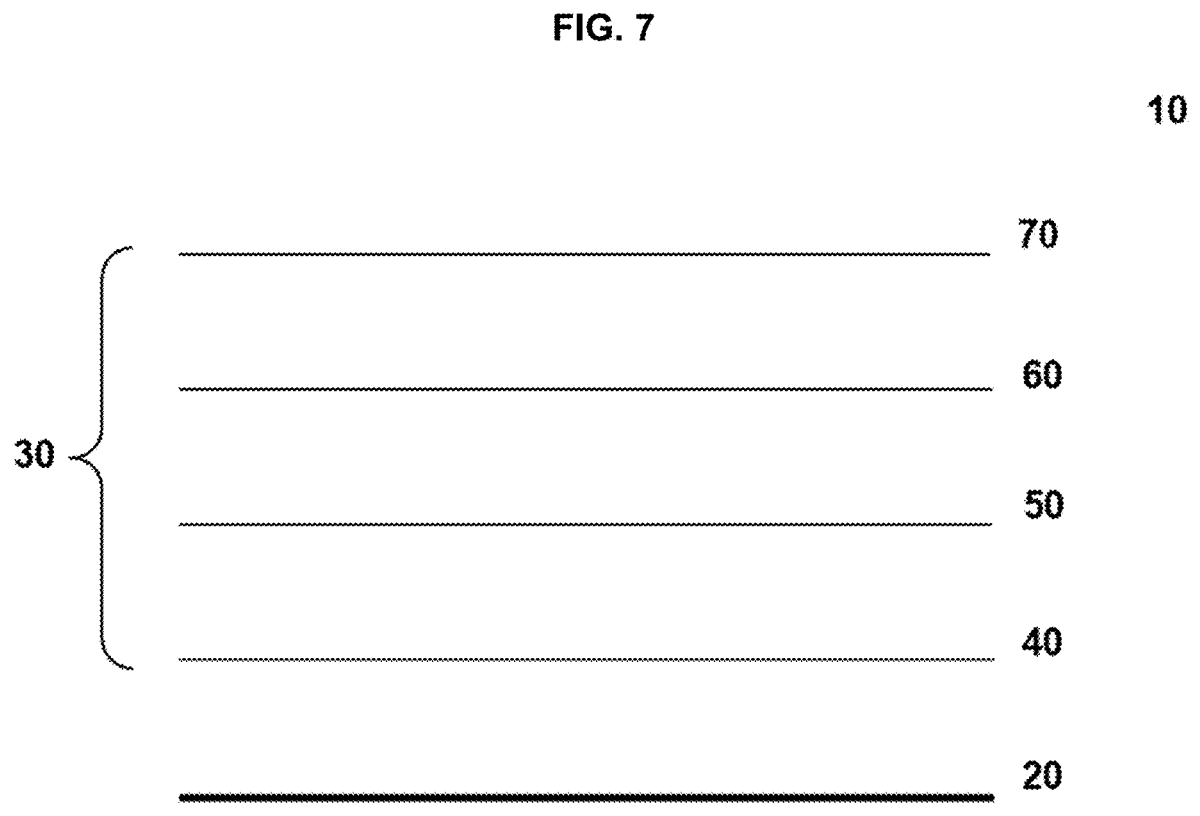

FIG. 7 shows a schematic of an embodiment of an optical article as disclosed herein. The optical article includes a substrate with a multilayered antireflective coating comprising at least two layers having a refractive index higher than or equal to 1.55, i.e., at least two high index (HI) layers, and at least two layers having a refractive index lower than 1.55, i.e., at least two low index (LI) layers. In the depicted optical article embodiment, optical article 10 includes substrate 20 with a multilayered antireflective coating stack 30. The multilayered antireflective coating stack 30 includes a thin HI layer 40, a thin LI layer 50, a thick HI layer 60, and an LI outer layer 70.

5. DETAILED DESCRIPTION OF THE INVENTION AND PREFERRED EMBODIMENTS

A) Definitions

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also, unless otherwise indicated, the indication of an interval of values «from X to Y» or "between X to Y", according to the present invention, means as including the values of X and Y.

In the present application, when an optical lens comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

In the present application, a layer of the antireflective coating is said to be a layer with a high refractive index (HI)

when its refractive index is higher than or equal to 1.55, preferably higher than or equal to 1.6, even more preferably higher than or equal to 1.90, such as 1.95 even more preferably higher than or equal to 2.00, such as 2.14.

A layer of the antireflective coating is said to be a low refractive index layer (LI) when its refractive index is lower than 1.55, preferably lower than or equal to 1.50, more preferably lower than or equal to 1.48. Said LI layer preferably has a refractive index higher than 1.1.

Unless otherwise specified, the refractive indexes referred to in the present application are expressed at 25° C. at a wavelength of 550 nm.

As used herein, a layer of the antireflective coating is defined as having a thickness higher than or equal to 1 nm. Thus, any layer having a thickness lower than 1 nm will not be considered when counting the number of layers in the antireflective coating. A sub-layer such as described hereafter either is not considered when counting the number of layers of the antireflective coating.

According to the invention and unless stated otherwise, all thicknesses disclosed in the present application relate to physical thicknesses.

As used herein, the rear (or the inner) face of the substrate is intended to mean the face which, when using the article, is the nearest from the wearer's eye. It is generally a concave face. On the contrary, the front face of the substrate, is the face which, when using the article, is the most distant from the wearer's eye. It is generally a convex face.

In addition, according to the invention, the "angle of incidence (symbol θ)" is the angle formed by a ray light incident on an optical lens surface and a normal to the surface at the point of incidence.

The optical lens of the present invention is preferably a lens or lens blank, and more preferably or lens blank. The optical lens may be coated on its convex main side (front side), concave main side (back side), or both sides using the process of the invention.

According to the invention, The "mean light reflection factor," noted $R_v$, is such as defined in the ISO 13666:1998 Standard, and measured in accordance with the ISO 8980-4, i.e. this is the weighted spectral reflection average over the whole visible spectrum between 380 and 780 nm. $R_v$ is usually measured for an angle of incidence lower than 17°, typically of 15°, but can be evaluated for any angle of incidence.

Hereafter, the characteristic mean reflection factor in the near infrared (NIR) region $R_m^{NIR}$ (780-1400 nm) is defined by the formula:

$$R_M^{NIR} = \frac{\int_{780}^{1400} R(\lambda)d\lambda}{1400 - 780}$$

wherein $R(\lambda)$ represents the reflection factor at wavelength $\lambda$. $R_m^{NIR}$ can be measured for any angle of incidence θ, based on $R(\lambda)$ measured at the same angle of incidence.

In the present application, the mean reflection factor between 280 nm and 380 nm, weighted by the $W(\lambda)$ function defined according to the ISO 13666:1998 Standard and noted $R_{UV}$, may be defined through the following relation:

$$R_{UV} = \frac{\int\limits_{280}^{380} W(\lambda).R(\lambda).d\lambda}{\int\limits_{280}^{380} W(\lambda).d\lambda}$$

wherein R(λ) represents the lens spectral reflection factor at a given wavelength, and W(λ) represents a weighting function equal to the product of the solar spectrum irradiance Es(λ) and the efficiency relative spectral function S(λ).

The spectral function W(λ), enabling to calculate the ultraviolet radiation transmission factors, is defined according to the ISO 13666:1998 Standard. It makes it possible to express the ultraviolet solar radiation distribution tempered by the relative spectral efficiency of such radiation for the wearer, since it simultaneously takes both the solar spectral energy Es(λ) into account, which does globally emit less UVB-rays as compared to UVA-rays, and the spectral efficiency S(λ), UVB-rays being more harmful than UVA-rays. The values for those three functions in the ultraviolet region are given in the following table 1:

TABLE 1

| Wavelength λ (nm) | Solar spectrum irradiance Es(λ) (mW/m² · nm) | Efficiency relative spectral function S(λ) | Weighting function W(λ) = Es(λ) · S(λ) |
|---|---|---|---|
| 280 | 0 | 0.88 | 0 |
| 285 | 0 | 0.77 | 0 |
| 290 | 0 | 0.64 | 0 |
| 295 | $2.09 \times 10^{-4}$ | 0.54 | 0.00011 |
| 300 | $8.10 \times 10^{-2}$ | 0.30 | 0.0243 |
| 305 | 1.91 | 0.060 | 0.115 |
| 310 | 11.0 | 0.015 | 0.165 |
| 315 | 30.0 | 0.003 | 0.09 |
| 320 | 54.0 | 0.0010 | 0.054 |
| 325 | 79.2 | 0.00050 | 0.04 |
| 330 | 101 | 0.00041 | 0.041 |
| 335 | 128 | 0.00034 | 0.044 |
| 340 | 151 | 0.00028 | 0.042 |
| 345 | 170 | 0.00024 | 0.041 |
| 350 | 188 | 0.00020 | 0.038 |
| 355 | 210 | 0.00016 | 0.034 |
| 360 | 233 | 0.00013 | 0.03 |
| 365 | 253 | 0.00011 | 0.028 |
| 370 | 279 | 0.000093 | 0.026 |
| 375 | 306 | 0.000077 | 0.024 |
| 380 | 336 | 0.000064 | 0.022 |

It should be noted that the weighting function W(λ) is nil or almost nil between 280 nm and 295 nm, which means that the weighted mean reflection factor is also nil within this wavelength range. This means that even if the reflection level is high over this spectral range, there will be no consequence on the weighted mean reflection factor value $R_{UV}$ calculated between 280 and 380 nm.

According to the invention, the mean reflection factor $R_m^B$ of blue light (420-450 nm) is defined by the formula:

$$R_M^B = \frac{\int\limits_{420}^{450} R(\lambda)d\lambda}{450 - 420}$$

wherein R(λ) represents the reflection factor at wavelength A. $R_m^B$ can be measured for any angle of incidence θ, based on R(λ) measured at the same angle of incidence.

B) Substrates According to the Invention

Generally speaking, the antireflective coating of the optical lens according to the invention, which will be called "the antireflective coating", may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; poly(ethylene terephthalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth) acrylic acid and esters thereof, polymer and copolymer of allyl esters which may be derived from Bisphenol A or phthalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co) polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Homopolymers of diethylene glycol bis(allyl carbonate) (CR 39®), allylic and (meth)acrylic copolymers, having a refractive index between 1.54 and 1.58, polymer and copolymer of thiourethane, polycarbonates are preferred.

The substrate may be coated with one or more functional coatings prior to depositing the antireflective coating of the invention. These functional coatings traditionally used in optics may be, without limitation, an impact-resistant primer layer, an abrasion-resistant coating and/or a scratch-resistant coating, a polarizing coating, a photochromic coating or a tinted coating. In the following a substrate means either a bare substrate or such a coated substrate.

Prior to depositing the antireflective coating, the surface of said substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

C) Antireflective Coating According to the Invention

As previously mentioned, the optical lens comprising a substrate with a front main face and with a rear main face, said rear main face being coated with a multilayered anti-reflective coating (hereafter "AR coating") comprising a stack of at least two layers having a refractive index higher than or equal 1.55, defined as "HI layer" and at least two layers having a refractive index lower than 1.55, defined as LI layer, characterized in that said multilayered antireflective coating is such that:

the mean reflection factor in the near infrared (NIR) region $R_m^{NIR}$ is lower than or equal to 8% at an angle of incidence of 35°, and the mean reflection factor $R_{UV}$ (280-380 nm), weighted by the function W($\lambda$) defined in the ISO 13666:1998 standard, is equal to or lower than 5% at an angle of incidence of 35°.

The Applicant has surprisingly discovered that the multilayered antireflective coating according to the invention shows good compromise between low $R_v$ and both low mean reflection factor in the NIR and mean reflection factor $R_{UV}$, while preferably having a relatively thin physical thickness (equal to or lower than 500 nm, preferably equal to or lower than 400 nm).

Indeed, as it will be shown in the examples below, the antireflective coating according to the invention enables to obtain a minimum achievable $R_v \leq 0.57\%$ at an angle of incidence of 15° and at the same time, for an angle of incidence of 45°, a very low mean reflection factor in NIR region (780-1400 nm) ($\leq 7.32\%$), a very low mean reflection factor $R_{UV}$ (280-380 nm) (2.81%) and a very low reflection in harmful blue blight region (420-450 nm) (0.74%).

In addition, the multilayered antireflective coating according to the invention presents the advantage of having a good robustness and aesthetic appearance. Herein, the term "robustness" of a lens is defined as the ability of this lens to resist change despite the variations induced by its manufacture process. These variations depend, for instance, on the type of substrate which is used, the setting of the manufacturing machine (temperature schedule, appropriate time, setting of the electron gun . . . ) and/or its usage mode, the replacement of said manufacturing machine by another one.

As used herein, a $R_m^{NIR}$ value lower than or equal to 8% at an angle of incidence of 35°, includes the following values and/or any intervals comprised between these values (limits included): 8; 7.9; 7.8; 7.7; 7.6; 7.5; 7.4; 7.3; 7.2; 7.1; 7.0; 6.9; 6.8; 6.7; 6.6; 6.5; 6.4; 6.3; 6.2; 6.1; 6.0; 5.9; 5.8; 5.7; 5.6; 5.5; 5.4; 5.3; 5.2; 5.1; 5.0; 4.9; 4.8; 4.7; 4.6; 4.5; etc.

According to a characteristic of the invention, the mean reflection factor in the near infrared (NIR) region $R_m^{NIR}$ of the antireflective coating is lower than or equal to 7%, preferably 6.5% at an angle of incidence of 35°.

According to another characteristic of the invention, the mean reflection factor in the near infrared (NIR) region $R_m^{NIR}$ of the antireflective coating is lower than or equal to 10%, preferably 7.5% and typically is lower than or equal to 7% at an angle of incidence of 45°.

As used herein, a $R_m^{NIR}$ value lower than or equal to 10% at an angle of incidence of 45°, includes the following values and/or any intervals comprised between these values (limits included): 10; 9.9; 9.8; 9.7; 9.6; 9.5; 9.4; 9.3; 9.2; 9.1; 9.0; 8.9; 8.8; 8.7; 8.6; 8.5; 8.4; 8.3; 8.2; 8.1; 8.0; 7.9; 7.8; 7.7; 7.6; 7.5; 7.4; 7.3; 7.2; 7.1; 7.0; 6.9; 6.8; 6.7; 6.6; 6.5; 6.4; 6.3; 6.2; 6.1; 6.0; 5.9; 5.8; 5.7; 5.6; 5.5; 5.4; 5.3; 5.2; 5.1; 5.0; etc.

In addition, the AR coating according to the invention is efficient to limit the reflection of UV radiation.

Indeed, generally, the mean reflection factor $R_{UV}$ between 280 nm and 380 nm, weighted by the function W($\lambda$) defined in the ISO 13666:1998 standard, is equal to or lower than 4.0%, preferably 3.5% at an angle of incidence of 35°.

Also, the mean reflection factor $R_{UV}$ (280-380 nm), weighted by the function W($\lambda$) defined in the ISO 13666: 1998 standard, is preferably equal to or lower than 4%, more preferably equal to or lower than 3.5% at an angle of incidence of 45°.

As used herein, an interval lower than or equal to 5%, includes the following values and/or any intervals comprised between these values (limits included): 5; 4.5; 4.0; 3.5; etc.

Moreover, the AR coating according to the invention is efficient to limit the reflection of harmful blue light.

Especially, the mean reflection factor $R_m^B$ of blue light at a wavelength ranging from 420 to 450 nm has a value $R_m^B$ which is equal to or lower than 3.0%, preferably 2.5% at an angle of incidence of 35° or which is equal to or lower than 3.0%, preferably equal to or lower than 2.5% and more preferably equal to or lower than 2% at an angle of incidence of 45°.

As used herein, an interval lower than or equal to 3%, includes the following values and/or any intervals comprised between these values (limits included): 3; 2.5; 2; 1.5; 1; etc.

This characteristic enables a lower reflection of blue light for light arriving on the back side of the optical lens with a high incidence angle (35° or) 45°. The lens wearer is then protected more efficiently from blue light arriving from his back side.

As mentioned above, the multilayered antireflective coating described in this application is also very efficient in the visible region.

Especially, the mean light reflection factor in the visible region $R_v$ of the antireflective coating is lower than or equal to 1.5%, preferably lower than or equal to 1.0%, more preferably lower than or equal to 0.9%, for at least an angle of incidence lower than or equal to 15°.

As used herein, an interval lower than or equal to 1.5%, includes the following values and/or any intervals comprised between these values (limits included): 1.5; 1.0; 0.99; 0.98; 0.97; 0.96; 0.95; 0.94; 0.93; 0.92; 0.91; 0.90; 0.85; 0.80; 0.75; 0.70; 0.65; 0.60; 0.50; etc.

As previously mentioned, the multilayered antireflective coating of the invention comprises a stack of at least four layers made of dielectric materials having a high refractive index (HI) and a low refractive index (LI).

Indeed, the antireflective coating comprises at least two layers with a low refractive index (LI), at least two layers with a high refractive index layer (HI). It is here a simple stack, since the layer total number in the antireflective coating is higher than or equal to 4 and in general lower than or equal to 12.

According to a characteristic of the invention, the layer total number in the antireflective coating is higher than or equal to 5, more preferably higher than or equal to 6, typically higher than or equal to 7, in particular higher than or equal to 8.

According to another characteristic of the invention, the layer total number in the antireflective coating is lower than or equal to 11, more preferably lower than or equal to 10, even more preferably lower than or equal to 9, and most preferably equal to or lower than 8 layers.

As used herein, a layer of the antireflective coating is defined as having a thickness higher than or equal to 1 nm. Thus, any layer having a thickness lower than 1 nm will not be considered when counting the number of layers in the antireflective coating. A sub-layer such as described hereafter either is not considered when counting the number of layers of the antireflective coating.

HI layers and LI layers don't need to alternate with each other in the stack, although they also may, according to one embodiment of the invention. Two HI layers (or more) may be deposited onto each other, as well as two LI layers (or more) may be deposited onto each other.

In general, the HI layers and LI layers alternate with each other in the stack of the AR coating according to the invention.

Preferably, the antireflective coating total thickness is lower than or equal to 600 nm, more preferably lower than or equal to 550 nm and even more preferably lower than or equal to 400 nm. The antireflective coating total thickness is generally higher than 300 nm, preferably higher than or equal to 320 nm. Typically, the physical thickness of said antireflective coating is ranging from 350 to 390 nm.

As used herein, an interval lower than or equal to 600 nm includes the following values and/or any intervals comprised between these values (limits included): 600; 550; 540; 530; 520; 510; 500; 490; 480; 470; 480; 470; 460; 450; 440; 430; 420; 410; 400; 390; 380; 370; 360; 350; 340; 330; 320; 310; 300, etc.

Unless stated otherwise, all thicknesses disclosed in the present application relate to physical thicknesses.

According to a characteristic of the invention, one of said at least two HI layers has a physical thickness higher than 120 nm, defined hereafter as "the thick HI layer" and wherein each of the other LI layers and HI layer(s) has a physical thickness lower than or equal to 120 nm.

As used herein, an interval higher than or equal to 120 nm includes the following values and/or any intervals comprised between these values (limits included): 120; 125; 130; 135; 140; 145; 150; 155; 160; 165; 170; 175; 180; 185; 190; 195; 200; 210; etc.

Preferably, said "thick HI layer" has a physical thickness equal to or higher than 130 nm, in particular equal to or higher than 150 nm, preferably equal to or higher than 170 nm and typically equal to or higher than 180 nm. In general, said "thick HI layer" has a physical thickness equal to or lower than 210 nm, preferably equal to or lower than 200 nm.

Generally, said "thick HI layer" is, in the direction moving away from the substrate, in the last or in the second last place among all the HI layers of said multilayered antireflective coating. Indeed, said "thick HI layer" is in general in the last place (in the direction moving away from the substrate) among all the HI layers of said multilayered antireflective coating, but may be positioned in the second last place among all the HI layers especially when the AR coating comprises an antistatic layer. This antistatic layer will be described hereafter.

According to a characteristic of the invention, the total thickness of the remaining layers (e.g. all the layers of the AR coating minus said "thick HI layer") is lower than or equal to 230 nm, preferably equal to or lower than 220 nm, more preferably lower than or equal to 210 nm, and typically lower than or equal to 200 nm.

Among said remaining layers, the AR coating of the invention comprises the other HI layer. Especially, said other HI layer (among said at least two HI layers), defined hereafter as "thin HI layer", has a physical thickness equal to or lower than 30 nm, preferably equal to or lower than 25 nm.

As used herein, an interval lower than or equal to 30 nm includes the following values and/or any intervals comprised between these values (limits included): 30; 29; 28; 27; 26; 25; 24; 23; 22; 21; 20; 19; 18; 17; 16; 15; etc.

Especially, said "thin HI layer" is, in the direction moving away from the substrate, the nearest from the substrate among all the HI layers of the multilayered antireflective coating and preferably among all the LI layers and the HI layers of the multilayered antireflective coating. In general, this "thin HI layer" is positioned, preferably directly, onto an anti-abrasion coating and/or anti-scratch coating such as described below or directly onto the substrate.

The AR coating also comprises two LI layers. Especially, one of said two LI layers is, in the direction moving away from the substrate, the layer which is the farthest from the substrate, defined hereafter as "the outer layer". This LI "outer layer" has in general a physical thickness ranging from 50 to 105 nm, preferably ranging from 60 to 95 nm.

The other LI layer of the AR coating is in general thinner than the above-mentioned LI "outer layer" and is named hereafter the "thin LI layer". This "thin LI layer" has preferably a thickness lower than or equal to 25 nm, more preferably lower than or equal to 20 nm and in particular lower than or equal to 15 nm. This "thin LI layer" is, in the direction moving away from said substrate, positioned below the above-mentioned thick HI layer and preferably is in direct contact with said thick HI layer.

According to a characteristic of the invention, the AR coating may comprise another LI layer that is different from the above-mentioned "LI outer layer" and "LI thin layer". This third LI layer is generally the LI layer that is the nearest from the substrate (in the direction moving away from the substrate) among all the LI layers. Typically, this third layer is positioned (in the direction moving away from the substrate) directly onto the above-mentioned thin HI layer. This third LI layer has advantageously a physical thickness ranging from 10 to 50 nm, preferably from 15 to 40 nm.

According to another characteristic of the invention, the AR coating may comprise another HI layer that is different from the above-mentioned "thick HI layer" and "thin HI layer". This third HI layer is, in the direction moving away from the substrate, the second HI layer among all the HI layers. Typically, this third HI layer is positioned directly onto the above-mentioned third LI layer. Advantageously, this third HI layer has a physical thickness ranging from 25 to 70 nm, preferably ranging from 30 to 60 nm.

According to another characteristic of the invention, the AR coating may comprise another LI layer that is different from the above-mentioned "LI outer layer", "thin LI layer" and the "third LI layer". This fourth LI layer is generally the LI layer that is positioned, in the direction moving away from the substrate, in second to last place in the AR coating among all the LI layers. Typically, this fourth LI layer is positioned (in the direction moving away from the substrate) directly onto the above-mentioned thick HI layer. This fourth LI layer has advantageously a physical thickness ranging from 10 to 40 nm, preferably from 14 to 25 nm.

According to another characteristic of the invention, the AR coating may comprise an antistatic layer (also named electrically conductive layer) such as described below. In general, this antistatic layer is positioned in the direction moving away from the substrate below and preferably directly below the "LI outer layer".

According to an embodiment of the invention, the multilayered antireflective coating may comprise, in the direction moving away from the substrate, the "thin HI layer" with a physical thickness lower than or equal to 30 nm, preferably ranging from 5 to 30 nm, more preferably ranging from 14 to 22 nm;

the optional "third LI layer", that is the nearest from the substrate among all the LI layers, and having a physical thickness ranging from 10 to 50 nm, more preferably ranging from 18 to 40 nm;

the optional "third HI layer", that is the second HI layer from the substrate among all the HI layers, having a physical thickness ranging from 25 to 70 nm, more preferably ranging from 40 to 60 nm;

the "thin LI layer" having a physical thickness lower than or equal to 25 nm, preferably ranging from 3 to 25 nm, more preferably ranging from 5 to 18 nm;

the "thick HI layer" having a physical thickness equal to or higher than 150 nm, preferably ranging from 150 to 200 nm, more preferably ranging from 180 to 195 nm;

the optional "fourth LI layer" having a physical thickness ranging from 10 to 40 nm, more preferably ranging from 15 to 25 nm;

the optional "electrically conductive layer" with a physical thickness ranging from 3 to 10 nm, more preferably ranging from 4 to 7 nm;

the "LI outer layer" having a physical thickness ranging from 50 to 105 nm, preferably ranging from 60 to 90 nm, more preferably ranging from 60 to 93 nm.

According to the invention, the HI layer is a traditional high refractive index layer that is well known in the art. It generally comprises one or more metal oxides such as, without limitation, zirconia ($ZrO_2$), alumina ($Al_2O_3$), tantalum pentoxide ($Ta_2O_5$), praseodymium oxide ($Pr_2O_3$), praseodymium titanate ($PrTiO_3$), lanthanum oxide ($La_2O_3$), yttrium oxide ($Y_2O_3$), niobium oxide ($Nb_2O_5$), titanium dioxide ($TiO_2$) and mixtures thereof. The preferred materials include zirconia ($ZrO_2$), tantalum pentoxide ($Ta_2O_5$). Optionally, the HI layers may further contain silica or other materials, with a low refractive index, provided they have a refractive index higher than or equal to 1.6 as indicated hereabove. According to a characteristic of the invention, the HI layer does not comprise titanium dioxide ($TiO_2$).

The LI layer is also well known and may comprise, without limitation, $MgF_2$, $SiO_2$, a mixture of silica and alumina, especially silica doped with alumina (the latter contributing to increase the antireflective coating thermal resistance), or a mixture thereof. The LI layer is preferably a layer comprising at least 80% by weight of silica, more preferably at least 90% by weight of silica, relative to the layer total weight, and even more preferably consists in a silica layer ($SiO_2$). Optionally, the LI layers may further contain materials with a high refractive index or very high refractive index, provided the refractive index of the resulting layer is lower than to 1.6.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

As mentioned above, the optical lens of the invention may be made antistatic that is to say not to retain and/or develop a substantial static charge, by incorporating at least one electrically conductive layer into the stack present on the surface of the article.

The ability for a glass to evacuate a static charge obtained after rubbing with a piece of cloth or using any other procedure to generate a static charge (charge applied by corona . . . ) may be quantified by measuring the time it takes for said charge to dissipate. Thus, antistatic glasses have a discharge time of about a few hundred milliseconds, preferably 500 ms or less, whereas it is of about several tens of seconds for a static glass. In the present application, discharge times are measured according to the method exposed in the French application FR 2 943 798.

As used herein, an "electrically conductive layer" or an "antistatic layer" is intended to mean a layer which, due to its presence on the surface of a non-antistatic substrate (i.e. having a discharge time higher than 500 ms), enables to have a discharge time of 500 ms or less after a static charge has been applied onto the surface thereof.

The electrically conductive layer may be located on various places in the stack, generally in or in contact with the antireflective coating, provided the antireflective properties thereof are not affected. It is preferably located between two layers of the antireflective coating, and/or is adjacent to a layer with a high refractive index of such antireflective coating. Preferably, the electrically conductive layer is located immediately under a layer with a low refractive index of the antireflective coating, most preferably is the penultimate layer of the antireflective coating by being located immediately under the silica-based outer layer of the antireflective coating: e.g. the "LI outer layer".

The electrically conductive layer should be thin enough not to alter the transparency of the antireflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminum-doped zinc oxide (ZnO:Al), indium oxide ($In_2O_3$) and tin oxide ($SnO_2$) are preferred. In a most preferred embodiment, the electrically conductive and optically transparent layer is a tin-indium oxide layer, noted ITO layer or a tin oxide layer.

Generally, the electrically conductive layer contributes, within the stack, but in a limited manner, because of its low thickness, to obtain antireflective properties and represents a layer with a high refractive index in the antireflective coating. This is the case for those layers made from an electrically conductive and highly transparent material such as ITO layers.

The antireflective coating does not comprise any layer with a thickness higher than or equal to 20 nm, preferably higher than 15 nm, based on indium oxide. When a plurality of indium oxide-based layers are present in the antireflective coating, their total thickness is preferably lower than 20 nm, more preferably lower than 15 nm. As used herein, an indium oxide-based layer is intended to mean a layer comprising at least 50% by weight of indium oxide relative to the layer total weight.

According to a preferred embodiment, the antireflective coating does not comprise any layer with a thickness higher than or equal to 20 nm, preferably higher than 15 nm, comprising indium oxide, tin oxide or zinc oxide. When a plurality of layers comprising indium oxide, tin oxide or zinc oxide are present in the antireflective coating, their total thickness is preferably lower than 20 nm, more preferably lower than 15 nm.

The present invention provides hence an antireflective coating with an improved conception, comprising a relatively thin stack made of layers, the thicknesses and materials of which have been selected so as to obtain satisfactory antireflective performances and a good compromise between low reflection at the same times in the NIR region, in the UV radiation and in the phototoxic blue light region, while having robustness properties and low reflection in the visible region. Indeed, the AR coating of the invention has concurrently low reflection over a broad light spectrum, ranging from UV rang to NIR region.

Generally, the optical lens is an ophthalmic lens such as a spectacle lens. The antireflective coatings of the front face and of the rear face may be preferably different.

In an embodiment of the invention, the rear face of the optical lens of the invention is coated with the antireflective coating described above. In another embodiment, the front face of the optical lens of the invention is coated with a conventional antireflective coating having a mean reflection factor in UV range (as defined in WO2012076714) $R_{uv} \leq 10\%$, preferably $R_{uv} \leq 5\%$, different from the one provided on its rear face which is according to the invention.

In one embodiment, the optical lens according to the invention does not absorb in the visible or not much, which means, in the context of the present application, that its transmission factor in the visible range $\tau_v$, also called relative transmission factor in the visible range, is higher than 90%, more preferably higher than 95%, even more preferably higher than 96% and most preferably higher than 97%.

The factor ty should be understood as defined by the international normalized definition (ISO 13666:1998 Standard) and is measured in accordance with the ISO 8980-3 Standard. It is defined in the wavelength range of from 380 to 780 nm.

Preferably, the light absorption of the article coated according to the invention is lower than or equal to 1%.

In another embodiment, the optical lens according to the invention is a tinted lens, especially a sunglasses, category 1, 2 3 or 4.

D) Sub-Layer

In one embodiment of the present invention, the antireflective coating may be deposited onto a sub-layer. It should be noted that such sub-layer does not belong to the antireflective coating.

As used herein, a sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

Because of its relatively high thickness, the sub-layer does not generally take part to the antireflective optical activity, especially when it has a refractive index close to that of the underlying substrate (which is generally the anti-abrasion and anti-scratch coating or the bare substrate).

The sub-layer should have a thickness that is sufficient for promoting the abrasion resistance of the antireflective coating, but preferably not to such an extent that a light absorption could be caused, which, depending on the sub-layer nature, could significantly reduce the relative transmission factor w. Its thickness is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such silica-based layer is generally lower than 300 nm, more preferably lower than 200 nm, and is generally higher than 90 nm, more preferably higher than 100 nm.

In another embodiment, this $SiO_2$-based layer is a silica layer doped with alumina, in amounts such as defined hereabove, preferably consists in a silica layer doped with alumina.

In a particular embodiment, the sub-layer consists in a $SiO_2$ layer.

A sub-layer of the monolayer type will be preferably used. However, the sub-layer may be laminated (multilayered), especially when the sub-layer and the underlying substrate have a substantially different refractive index. This applies especially when the underlying substrate, has a high refractive index, i.e. a refractive index higher than or equal to 1.55, preferably higher than or equal to 1.57.

In this case, the sub-layer may comprise, in addition to a 90-300 nm-thick layer, called the main layer, preferably at most three additional layers, more preferably at most two additional layers, interleaved between the optionally coated substrate and such 90-300 nm-thick layer, which is generally a silica-based layer. These additional layers are preferably thin layers, which function aims at limiting the reflections at the sub-layer/underlying coating interface or sub-layer/substrate interface, as appropriate.

A multilayered sub-layer preferably comprises, in addition to the main layer, a layer with a high refractive index and with a thickness lower than or equal to 80 nm, more preferably lower than or equal to 50 nm and most preferably lower than or equal to 30 nm. Such layer with a high refractive index is directly contacting the substrate with a high refractive index or the underlying coating with a high refractive index, as appropriate. Of course, this embodiment may be used even if the substrate (or the underlying coating) has a refractive index lower than 1.55.

As an alternative, the sub-layer comprises, in addition to the main layer and to the previously mentioned layer with a high refractive index, a layer made of a $SiO_2$-based material (that is to say comprising preferably at least 80% by weight of silica) with a refractive index lower than or equal to 1.55, preferably lower than or equal to 1.52, more preferably lower than or equal to 1.50, and with a thickness lower than or equal to 80 nm, more preferably lower than or equal to 50 nm and even more preferably lower than or equal to 30 nm, onto which is deposited said layer with a high refractive index. Typically, in this instance, the sub-layer comprises, deposited in this order onto the optionally coated substrate, a 25 nm-thick $SiO_2$ layer, a 10 nm-thick $ZrO_2$ or $Ta_2O_5$ layer and thereafter the sub-layer main layer.

According to an embodiment, the antireflective coating is not deposited onto a sub-layer such as described above.

E) Process

The various layers of the antireflective coating and the optional sub-layer are preferably deposited by chemical vapor deposition, under vacuum, according to any of the following methods: i) by optionally ion-beam assisted, evaporation; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the antireflective coating and of the optional sub-layer is conducted by evaporation under vacuum.

F) Other Functional Layers

Generally, the front and/or rear main face of the substrate onto which an antireflective coating will be deposited is coated with an impact-resistant primer layer, with an anti-abrasion and/or anti-scratch coating, or with an impact-resistant primer layer coated with an anti-abrasion and/or anti-scratch coating.

The antireflective coating of the invention is preferably deposited onto an anti-abrasion and/or anti-scratch coating. The anti-abrasion and/or scratch-resistant coating may be any layer traditionally used as an anti-abrasion and/or anti-scratch coating in the field of optical lenses.

The anti-abrasion and/or scratch-resistant coatings are preferably hard coatings based on poly(meth)acrylates or silanes, generally comprising one or more mineral fillers intended to increase the hardness and/or the refractive index of the coating once cured.

Hard anti-abrasion and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings, that are recommended for the present invention include coatings based on epoxysilane hydrolyzates such as those described in the patents FR 2 702 486 (EP 0 614 957), U.S. Pat. Nos. 4,211,823 and 5,015,523.

The anti-abrasion and/or scratch-resistant coating composition may be deposited onto the main face of the substrate by dip- or spin-coating. It is then cured by a suitable method (preferably using heat or ultraviolet radiation).

The thickness of the anti-abrasion and/or scratch-resistant coating does generally vary from 2 to 10 μm, preferably from 3 to 5 μm.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a polymer material, such as ophthalmic lenses.

Preferred primer compositions are compositions based on polyurethanes and compositions based on latexes, especially polyurethane type latexes optionally containing polyester units.

Such primer compositions may be deposited onto the article faces by dip- or spin-coating, thereafter be dried at a temperature of at least 70° C. and up to 100° C., preferably of about 90° C., for a time period ranging from 2 minutes to 2 hours, generally of about 15 minutes, to form primer layers having thicknesses, after curing, of from 0.2 to 2.5 μm, preferably of from 0.5 to 1.5μ m.

The optical lens according to the invention may also comprise coatings formed on the antireflective coating and capable of modifying the surface properties thereof, such as hydrophobic and/or oleophobic coatings (antifouling topcoat). These coatings are preferably deposited onto the outer layer of the antireflective coating. As a rule, their thickness is lower than or equal to 10 nm, does preferably range from 1 to 10 nm, more preferably from 1 to 5 nm.

Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

Typically, an optical lens according to the invention comprises a substrate that is successively coated on its rear face with an impact-resistant primer layer, an anti-abrasion and scratch-resistant layer, an anti-UV, antireflective coating and with a hydrophobic and/or oleophobic coating, or with a hydrophilic coating which provides antifog properties, or an antifog precursor coating.

The front face of the substrate of the optical lens may be successively coated with an impact-resistant primer layer, an abrasion-resistant layer and/or a scratch-resistant layer, an antireflective coating according to the invention, and with a hydrophobic and/or oleophobic coating.

The optical lens according to the invention is preferably an ophthalmic lens, in particular a spectacle lens, or a blank for spectacle lens. The lens may be a polarized lens, a photochromic lens or a solar lens, which may be tinted or not, be corrective, or not.

The following examples illustrate the present invention in a more detailed, but non-limiting manner.

6. EXAMPLES

A) General Procedures

The optical articles used in the examples comprise a lens substrate, having a 65 mm diameter, a refractive index of 1.50 (ORMA® lens from ESSILOR) and a power of −2.00 diopters and a center thickness of 1.2 mm, coated on its front and rear faces with the following anti-abrasion and scratch-resistant coating.

The anti-abrasion and scratch-resistant coating disclosed in Example 3 of the patent EP 0 614 957 (refractive index equal to 1.47 and thickness of 3.5 μm), based on a hydrolyzate composed of GLYMO and DMDES, of colloidal silica and aluminium acetylacetonate is deposited on the substrate.

Said anti-abrasion and scratch-resistant coating was obtained by depositing and hardening a composition comprising by weight, 224 parts of GLYMO, 80.5 parts of HCl 0.1 N, 120 parts of DMDES, 718 parts of 30% by weight colloidal silica in methanol, 15 parts of aluminium acetylacetonate and 44 parts of ethylcellosolve. The composition also contained 0.1% of surfactant FLUORAD™ FC-430® manufactured by 3M, by weight relative to the composition total weight.

The anti-abrasion and scratch-resistant coating described above has a refractive index about 1.5 (hereinafter HC1.5) and is used for substrates having a refractive index of 1.5.

For substrates having a refractive index of 1.6, titanium dioxide particles are added in anti-abrasion and scratch-resistant coating described above to match a refractive index of 1.6 (hereinafter HC1.6).

The layers of the antireflective coating were deposited onto the rear face of the tested lenses without heating the substrates by evaporation under vacuum (evaporation source: electron gun).

The deposition frame is a Leybold 1104 machine fitted with an electron gun (ESV14 (8 kV)) for evaporating oxides, and provided with an ion gun (Commonwealth Mark II) for the preliminary phase to prepare the surface of the substrate using argon ions (IPC).

The thickness of the layers was controlled by means of a quartz microbalance. The spectral measurements were effected on a variable incidence-spectrophotometer Perkin-Elmer Lambda 850 with an URA accessory (Universal Reflectance Accessory).

B) Test Procedure

The method for making optical articles comprises the step of introducing the substrate, coated with the anti-abrasion and scratch-resistant coating, into a vacuum deposition chamber, a step of pumping until a high-vacuum is obtained, a step of activating the rear face of the substrate by means of an argon ion beam (anode current: 1 A, anode voltage: 100 V, neutralization current: 130 mA), turning the ion irradiation off, forming the various layers of the antireflective coating by successive evaporations on the rear face and last a ventilation step.

For comparison, examples 1 to 3 of the document US 2016/0003982 have been reproduced.

C) Results

C1. Comparative Examples (Examples 1 to 3 of US 2016/0003982)

TABLE 1

| Substrate | Comp. Ex. 1 (nm) | Comp. Ex. 2 (nm) | Comp. Ex. 3 (nm) |
|---|---|---|---|
| $SiO_2$ | 150 | 150 | 150 |
| $ZrO_2$ | 13.9 | 14.3 | 14.8 |
| $SiO_2$ | 32.1 | 32.2 | 34.3 |
| $ZrO_2$ | 64.5 | 61.5 | 58.6 |
| $SiO_2$ | 99.6 | 101.9 | 104.3 |

20

TABLE 1-continued

| | Comp. Ex. 1 | | | Comp. Ex. 2 | | | Comp. Ex. 3 | | |
|---|---|---|---|---|---|---|---|---|---|
| | 0° | 30° | 45° | 0° | 30° | 45° | 0° | 30° | 45° |
| $R_v$ (%) | 1.22 | 1.50 | 2.30 | 0.84 | 1.02 | 1.66 | 0.74 | 0.98 | 1.77 |
| $R_{uv}$ (%) | 3.43 | 3.34 | 4.68 | 7.41 | 6.88 | 7.54 | 4.69 | 5.90 | 8.09 |
| $R_m^B$ (%) | 1.41 | 0.46 | 0.97 | 0.44 | 0.24 | 1.21 | 2.03 | 0.62 | 0.62 |
| $R_m^{NIR}$ (%) | 8.86 | 10.9 | 14.35 | 11.29 | 12.46 | 13.95 | 8.67 | 10.36 | 13.73 |

Hence, as it shown above on Table 1, the exemplified anti-reflective coatings of this document do not enable to obtain both low reflection in the UVA-UVB-radiation range and in the NIR region, especially for an angle of incidence of 30° or 45°.

C2. AR of the Invention (Table 2 and FIGS. 1 to 6)

The structural characteristics and the optical performances of the optical lenses 1 to 6 obtained in the Examples 1 to 6 are detailed hereunder. The reflection graphs between 280 and 780 nm of these lenses 1 to 6 are illustrated on FIGS. 1 to 6, with angles of incidence of 0°, 15°, and 35°.

The optical values are those of the rear face. Factors $R_v$, $R_m^{NIR}$, $R_{uv}$ and $R_m^B$ of reflected light are provided for an angle of incidence of 15°, 35° and 45°, a standard illuminant D65 and a standard observer (angle) 10°.

The tested lenses 1 to 6 according to the invention have the following structure: substrate/thin HI layer/third LI layer/third HI layer/thin LI layer/thick HI layer/optional fourth LI layer/optional fourth HI layer (antistatic layer)/LI outer layer.

TABLE 2

| Example 1 Substrate + Hc1.5 | | Example 2 Substrate + HC1.5 | | Example 3 Substrate + HC1.6 | |
|---|---|---|---|---|---|
| $ZrO_2$ | 14.7 nm | $ZrO_2$ | 15.1 nm | $ZrO_2$ | 17.5 nm |
| $SiO_2$ | 29.3 nm | $SiO_2$ | 37.5 nm | $SiO_2$ | 19.1 nm |
| $ZrO_2$ | 46.3 nm | $ZrO_2$ | 33.0 nm | $ZrO_2$ | 56.9 nm |
| $SiO_2$ | 10.4 nm | $SiO_2$ | 13.0 nm | $SiO_2$ | 5.2 nm |
| $ZrO_2$ | 188.2 nm | $ZrO_2$ | 194.5 nm | $ZrO_2$ | 187.8 nm |
| $SiO_2$ | 81.3 nm | $SiO_2$ | 17.9 nm | $SiO_2$ | 79.2 nm |
| | | $SnO_2$ | 6.5 nm | | |
| | | $SiO_2$ | 64.7 nm | | |
| Air | | Air | | Air | |
| $R_v$ (15°) | 0.95% | $R_v$ (15°) | 0.80% | $R_v$ (15°) | 0.97% |
| $R_v$ (35°) | 1.27% | $R_v$ (35°) | 1.31% | $R_v$ (35°) | 1.36% |
| $R_v$ (45°) | 2.00% | $R_v$ (45°) | 2.13% | $R_v$ (45°) | 2.15% |
| $R_m^{NIR}$ (15°) | 5.14% | $R_m^{NIR}$ (15°) | 4.57% | $R_m^{NIR}$ (15°) | 5.53% |
| $R_m^{NIR}$ (35°) | 5.78% | $R_m^{NIR}$ (35°) | 5.33% | $R_m^{NIR}$ (35°) | 6.11% |
| $R_m^{NIR}$ (45°) | 6.81% | $R_m^{NIR}$ (45°) | 6.23% | $R_m^{NIR}$ (45°) | 7.09% |
| $R_{uv}$ (15°) | 5.59% | $R_{uv}$ (15°) | 5.46% | $R_{uv}$ (15°) | 4.90% |
| $R_{uv}$ (35°) | 3.35% | $R_{uv}$ (35°) | 3.20% | $R_{uv}$ (35°) | 3.07% |
| $R_{uv}$ (45°) | 3.44% | $R_{uv}$ (45°) | 3.42% | $R_{uv}$ (45°) | 3.09% |
| $R_m^B$ (15°) | 0.28% | $R_m^B$ (15°) | 1.76% | $R_m^B$ (15°) | 0.11% |
| $R_m^B$ (35°) | 0.26% | $R_m^B$ (35°) | 1.03% | $R_m^B$ (35°) | 0.34% |
| $R_m^B$ (45°) | 1.05% | $R_m^B$ (45°) | 0.95% | $R_m^B$ (45°) | 1.23% |

| Example 4 Substrate + Hc1.5 | | Example 5 Substrate + HC1.5 | | Example 6 Substrate + HC1.6 | | |
|---|---|---|---|---|---|---|
| $ZrO_2$ | 17.9 nm | $ZrO_2$ | 21.5 nm | $ZrO_2$ | $ZrO_2$ | 18.5 nm |
| $SiO_2$ | 19.0 nm | $MgF_2$ | 24.7 nm | $MgF_2$ | $MgF_2$ | 22.5 nm |
| $ZrO_2$ | 56.8 nm | $ZrO_2$ | 40.6 nm | $ZrO_2$ | $ZrO_2$ | 46.3 nm |
| $SiO_2$ | 5.6 nm | $MgF_2$ | 17.9 nm | $MgF_2$ | $MgF_2$ | 8.8 nm |

TABLE 2-continued

| ZrO$_2$ | 181.6 nm | ZrO$_2$ | 184.8 nm | ZrO$_2$ | ZrO$_2$ | 189.0 nm |
|---|---|---|---|---|---|---|
| SiO$_2$ | 6.5 nm | MgF$_2$ | 91.9 nm | MgF$_2$ | MgF$_2$ | 87.6 nm |
| SiO$_2$ | 77.5 nm | | | | | |
| | Air | | Air | | Air | |
| $R_v$ (15°) | 0.94% | $R_v$ (15°) | 0.95% | | $R_v$ (15°) | 0.57% |
| $R_v$ (35°) | 1.31% | $R_v$ (35°) | 1.12% | | $R_v$ (35°) | 1.19% |
| $R_v$ (45°) | 2.09% | $R_v$ (45°) | 1.62% | | $R_v$ (45°) | 2.12% |
| $R_m^{NIR}$ (15°) | 5.44% | $R_m^{NIR}$ (15°) | 5.14% | | $R_m^{NIR}$ (15°) | 5.30% |
| $R_m^{NIR}$ (35°) | 6.03% | $R_m^{NIR}$ (35°) | 5.98% | | $R_m^{NIR}$ (35°) | 6.16% |
| $R_m^{NIR}$ (45°) | 7.03% | $R_m^{NIR}$ (45°) | 7.12% | | $R_m^{NIR}$ (45°) | 7.32% |
| $R_{uv}$ (15°) | 5.00% | $R_{uv}$ (15°) | 6.44% | | $R_{uv}$ (15°) | 5.81% |
| $R_{uv}$ (35°) | 3.07% | $R_{uv}$ (35°) | 3.44% | | $R_{uv}$ (35°) | 3.13% |
| $R_{uv}$ (45°) | 3.00% | $R_{uv}$ (45°) | 3.33% | | $R_{uv}$ (45°) | 2.81% |
| $R_m^B$ (15°) | 0.10% | $R_m^B$ (15°) | 3.29% | | $R_m^B$ (15°) | 0.49% |
| $R_m^B$ (35°) | 0.35% | $R_m^B$ (35°) | 2.14% | | $R_m^B$ (35°) | 0.33% |
| $R_m^B$ (45°) | 1.26% | $R_m^B$ (45°) | 2.07% | | $R_m^B$ (45°) | 0.74% |

It could be observed from these examples 1 to 6, that the AR coatings according to the invention and comprising 6, 7 or 9 alternating layers of HI layers and LI layers enable to obtain concurrently low reflection over a broad light spectrum, ranging from UV rang to NIR region, especially as compared to the examples 1 to 3 of the prior art.

The invention claimed is:

1. An optical article comprising a substrate with a front main face and with a rear main face, said rear main face being coated with a multilayered antireflective coating comprising a stack of at least two layers having a refractive index higher than or equal 1.55, defined as "HI layer" and at least two layers having a refractive index lower than 1.55, defined as LI layer, wherein said multilayered antireflective coating is such that:

the mean reflection factor in the near infrared (NIR) region $R_m^{NIR}$ is lower than or equal to 8% at an angle of incidence of 35°; and the mean reflection factor RUV (280-380 nm), weighted by the function W($\lambda$) defined in the ISO 13666:1998 standard, is equal to or lower than 5% at an angle of incidence of 35°;

wherein one of said at least two HI layers has a physical thickness higher than 120 nm, defined as "the thick HI layer," and wherein each of the other LI layers and HI layer(s) has a physical thickness lower than or equal to 120 nm, and wherein the multilayered antireflective coating comprises, in the direction moving away from the substrate at least the following layers:

another HI layer among said at least two HI layers, defined as "thin HI layer," having a physical thickness equal to or lower than 30 nm;

one of said at least two LI layers, defined as "thin LI layer" having a physical thickness lower than or equal to 25 nm;

the "thick HI layer" having a physical thickness equal to or higher than 150 nm, and another LI layer among said at least two LI layers, defined as "LI outer layer" having a physical thickness ranging from 50 to 105 nm.

2. The optical article according to claim 1, wherein the mean light reflection factor in the visible region $R_v$ of said multilayered antireflective coating is lower than or equal to 1.5%, for at least an angle of incidence equal to or lower than 15°.

3. The optical article according to claim 2, wherein the mean light reflection factor in the visible region $R_v$ of said multilayered antireflective coating is lower than or equal to 1.0% for at least an angle of incidence equal to or lower than 15°.

4. The optical article according to claim 1, wherein said multilayered antireflective coating is such that:

the mean reflection factor in the near infrared (NIR) region $R_m^{NIR}$ is lower than or equal to 7% at an angle of incidence of 35°; and the mean reflection factor $R_{UV}$ between 280 nm and 380 nm, weighted by the function W($\lambda$) defined in the ISO 13666:1998 standard, is equal to or lower than 4.0%, at an angle of incidence of 35°.

5. The optical article according to claim 4, wherein said multilayered antireflective coating is such that:

the mean reflection factor in the near infrared (NIR) region $R_m^{NIR}$ is lower than or equal to 6.5% at an angle of incidence of 35°; and the mean reflection factor $R_{UV}$ between 280 nm and 380 nm, weighted by the function W($\lambda$) defined in the ISO 13666:1998 standard, is equal to or lower than 3.5% at an angle of incidence of 35°.

6. The optical article according to claim 1, wherein said multilayered antireflective coating is such that:

the mean reflection factor in the near infrared (NIR) region $R_m^{NIR}$ is lower than or equal to 10% at an angle of incidence of 45°, and the mean reflection factor $R_{UV}$ (280-380 nm), weighted by the function W($\lambda$) defined in the ISO 13666:1998 standard, is equal to or lower than 4% at an angle of incidence of 45°.

7. The optical article according to claim 6, wherein said multilayered antireflective coating is such that:

the mean reflection factor in the near infrared (NIR) region $R_m^{NIR}$ is lower than or equal to 7.5% at an angle of incidence of 45°; and the mean reflection factor $R_{UV}$ (280-380 nm), weighted by the function W($\lambda$) defined in the ISO 13666:1998 standard, is equal to or lower than 3.5% at an angle of incidence of 45°.

8. The optical article according to claim 1, wherein said multilayered antireflective coating is such that:

the mean reflection factor $R_m^B$ of blue light at a wavelength ranging from 420 to 450 nm has a value $R_m^B$ which is equal to or lower than 3.0% at an angle of incidence of 35° or at an angle of incidence of 45°.

9. The optical article according to claim 8, wherein said multilayered antireflective coating is such that:

the mean reflection factor $R_m^B$ of blue light at a wavelength ranging from 420 to 450 nm has a value $R_m^B$ which is equal to or lower than 2.5% at an angle of incidence of 35° or at an angle of incidence of 45°.

10. The optical article according to claim 1, wherein said thick HI layer is, in the direction moving away from said substrate, in the last or in the second last place among all the HI layers of said multilayered antireflective coating.

11. The optical article according to claim 1, wherein said thin HI layer is the layer that is the nearest from the substrate among all the HI layers of the multilayered antireflective coating and preferably among all the LI layers and the HI layers of the multilayered antireflective coating.

12. The optical article according to claim 1, wherein the "thin LI layer," is, in the direction moving away from said substrate, positioned below the thick HI layer.

13. The optical article according to claim 1, wherein the multilayered antireflective coating comprises, in the direction moving away from the substrate:

the "thin HI" layer;

a LI layer, that is the nearest from the substrate among all the LI layers, having a physical thickness ranging from 10 to 50 nm;

an optional HI layer, that is the second HI layer from the substrate among all the HI layers, having a physical thickness ranging from 25 to 70 nm;

the "thin LI layer";

the "thick HI layer";

an optional LI layer having a physical thickness ranging from 10 to 40 nm;

an optional electrically conductive layer with a physical thickness ranging from 3 to 10 nm; and the "LI outer layer".

14. The optical article according to claim 13, wherein the multilayered antireflective coating comprises, in the direction moving away from the substrate:

the "thin HI" layer;

the LI layer, that is the nearest from the substrate among all the LI layers;

another HI layer, that is the second HI layer from the substrate among all the HI layers, which has a physical thickness ranging from 25 to 70 nm;

the "thin LI layer";

the "thick HI layer";

an optional LI layer having a physical thickness ranging from 10 to 40 nm;

an optional electrically conductive layer with a physical thickness ranging from 3 to 10 nm;

the "LI outer layer".

15. The optical article according to claim 1, wherein "the LI outer layer," has a physical thickness ranging from 60 to 95 nm.

16. The optical article according to claim 1, wherein the multilayered antireflective coating comprises another LI layer, defined as "third LI layer," said third LI layer, in the direction moving away from said substrate, is the nearest from the substrate among all the LI layers, and has a physical thickness ranging from 10 to 50 nm.

17. The optical article according to claim 1, wherein the multilayered antireflective coating comprises another HI layer, defined as "third HI layer," said third HI layer, in the direction moving away from said substrate, is the second HI layer from the substrate among all the HI layers and has a physical thickness ranging from 25 to 70 nm.

18. The optical article according to claim 1, wherein the multilayered antireflective coating has a total thickness of lower than or equal to 600 nm.

19. The optical article according to claim 18, wherein the multilayered antireflective coating has a total thickness of lower than or equal to 400 nm.

20. The optical article according to claim 1, wherein said thin HI layer is the layer that is the nearest from the substrate among all the LI layers and the HI layers of the multilayered antireflective coating.

\* \* \* \* \*